United States Patent
Bracht et al.

(10) Patent No.: US 8,759,406 B2
(45) Date of Patent: Jun. 24, 2014

(54) PRODUCTION OF A SYNTHESIS GAS BLEND AND USE IN A FISCHER-TROPSCH PROCESS

(75) Inventors: Maarten Bracht, Amsterdam (NL); Martin John Fernie, Amsterdam (NL)

(73) Assignee: Shell Oil Company, Houston, TX (US)

( * ) Notice: Subject to any disclaimer, the term of this patent is extended or adjusted under 35 U.S.C. 154(b) by 371 days.

(21) Appl. No.: 13/265,362

(22) PCT Filed: Apr. 20, 2010

(86) PCT No.: PCT/EP2010/055200
§ 371 (c)(1),
(2), (4) Date: Nov. 29, 2011

(87) PCT Pub. No.: WO2010/122025
PCT Pub. Date: Oct. 28, 2010

(65) Prior Publication Data
US 2012/0095118 A1 Apr. 19, 2012

(30) Foreign Application Priority Data
Apr. 22, 2009 (EP) .................................. 09158483

(51) Int. Cl.
*C07C 27/00* (2006.01)

(52) U.S. Cl.
USPC ........... 518/706; 518/700; 518/703; 518/704; 518/705; 518/702

(58) Field of Classification Search
USPC .................. 518/700, 702, 703, 704, 705, 706
See application file for complete search history.

(56) References Cited

U.S. PATENT DOCUMENTS

| 2004/0181313 A1 | 9/2004 | Mohedas et al. ............... 700/268 |
| 2007/0004809 A1 | 1/2007 | Lattner et al. .................. 518/700 |

FOREIGN PATENT DOCUMENTS

| EP | 1106570 | 6/2001 | ................ C01B 3/38 |
| EP | 1219566 | 7/2002 | ................ C01B 3/38 |
| EP | 1403216 | 3/2004 | ................ C01B 3/38 |
| WO | WO2004041716 | 5/2004 | ................ C01B 3/38 |

OTHER PUBLICATIONS

Kuhre et al; "Partial Oxidation Grows Stronger in US"; Oil and Gas Journal vol. 69, No. 36; pp. 86-90; Sep. 6, 1971.

*Primary Examiner* — Jafar Parsa

(57) ABSTRACT

The invention is directed to a process for the production of hydrocarbon products from a methane comprising feedstock comprising of the steps of: preparing a feed syngas comprising hydrogen and carbon monoxide having a hydrogen/carbon monoxide molar feed ratio in a syngas manufacturing process and using the feed syngas in a Fischer-Tropsch process using one or more fixed bed catalyst beds as present in one or more syngas conversion reactors thereby obtaining the hydrocarbon product and an residual tail gas. The manufacturing process comprises of two parallel operated syngas manufacturing processes starting from the same gaseous methane comprising feedstock. One syngas manufacturing process is a partial oxidation (POX) process which prepares a syngas having a hydrogen/carbon monoxide [$H_2/CO$] molar ratio below the molar feed ratio and The second syngas manufacturing process is a heat exchange reforming (HER) process, which prepares a syngas having a hydrogen/carbon monoxide [$H_2/CO$] molar ratio above the molar feed ratio.

10 Claims, No Drawings

PRODUCTION OF A SYNTHESIS GAS BLEND AND USE IN A FISCHER-TROPSCH PROCESS

PRIORITY CLAIM

The present application claims priority from PCT/EP2010/055200, filed 20 Apr. 2010, which claims priority from European Application 09158483.9, filed 22 Apr. 2009.

BACKGROUND

The present invention relates to a process for the production of hydrocarbon products from a methane comprising feed by means of a Fischer-Tropsch process.

US-A-2007/0004809 discloses a process for producing synthesis gas blends which may be used as feed for a Fischer-Tropsch conversion process. In the process according to US-A-2007/0004809 the synthesis gas blend is prepared by mixing a syngas effluent stream from a steam reforming step with a syngas effluent from an oxygen-blown reforming step. The syngas effluent from the steam reforming step is compressed to a pressure substantially equal to that of the syngas effluent from the oxygen-blown reforming step before both syngas effluents are mixed into the synthesis gas blend that could be used as a feed to a Fischer-Tropsch conversion process. The $H_2/CO$ molar ratio of the synthesis gas blend formed is higher than 1.9.

WO-A-2004/041716 describes a process wherein a synthesis gas having a hydrogen to carbon monoxide molar ratio of about 2.04 is prepared in the illustrating examples starting from a natural gas feed by means of a so-called heat exchange steam reforming process. The heat exchange reforming process (HER Process) as disclosed includes an autothermal reformer (ATR) unit and a heat exchange reformer (HER) unit operated in combination. To both reformers a natural gas feed is supplied, although the bulk of the feed is directed to the HER tubeside, where the steam reforming reaction takes place. The partially reformed syngas effluent of the HER unit and the small portion of fresh feed are combined and fed to the ATR unit. The hot effluent of the ATR unit is in turn used to provide the heat of reaction in the HER unit by means of indirect heat exchange. The synthesis gas is used as feed to a Fischer-Tropsch synthesis step to obtain a hydrocarbon product and a residual tail gas. The residual tail gas is recycled to the ATR unit in this process after compressing to the ATR operating pressure.

The heat exchange reforming process is attractive because it has a high efficiency resulting in better conversion, lower oxygen usage and lower $CO_2$ emmissions in comparison with conventional steam reforming processes such as auto-thermal reforming. A disadvantage of the process of WO-A-2004/041716 is that the level of inerts in the synthesis gas is relatively high. Applicants found that in a Fischer-Tropsch synthesis step using one or more fixed catalysts beds, higher levels of inerts is detrimental for the selectivity to useful products of the Fischer-Tropsch conversion. The net result is that a HER process in conjunction with fixed bed Fischer Tropsch synthesis is less attractive since poorer conversion to useful products is achieved in the synthesis stage.

SUMMARY OF THE INVENTION

The object of this invention is to provide a process for the production of hydrocarbon products from a methane comprising feed by means of a Fischer-Tropsch process using one or more fixed bed catalyst beds which makes use of the high efficiency heat exchange reforming process while avoiding, or at least mitigating, the disadvantage of higher inerts levels in the product syngas as described above.

This object is achieved with the following process. A process for the production of hydrocarbon products from a methane comprising feedstock comprising of the steps of:

preparing a feed syngas comprising hydrogen and carbon monoxide having a hydrogen/carbon monoxide molar feed ratio in a syngas manufacturing process and using the feed syngas in a Fischer-Tropsch process using one or more fixed bed catalyst beds as present in one or more syngas conversion reactors thereby obtaining the hydrocarbon product and an residual tail gas, wherein the manufacturing process comprises of two parallel operated syngas manufacturing processes starting from the same gaseous methane comprising feedstock, wherein one syngas manufacturing process is a partial oxidation (POX) process which prepares a syngas having a hydrogen/carbon monoxide [$H_2/CO$] molar ratio below the molar feed ratio and wherein the second syngas manufacturing process is a heat exchange reforming (HER) process which prepares a syngas having a hydrogen/carbon monoxide [$H_2/CO$] molar ratio above the molar feed ratio.

DETAILED DESCRIPTION

Applicants found that by using the process of the present invention the optimal molar feed ratio can be achieved in a more carbon efficient manner than when only a POX process is used, while maintaining a lower level of inerts, defined as $CO_2$, $N_2$, $CH_4$, Ar, in the synthesis gas as fed to the fixed beds of Fischer-Tropsch catalyst than can be achieved with HER Process alone.

The methane comprising feedstock may be natural gas, associated gas or a mixture of $C_{1-4}$ hydrocarbons. The feed comprises mainly, i.e. more than 90 v/v %, especially more than 94%, $C_{1-4}$ hydrocarbons, and especially comprises at least 60 v/v percent methane, preferably at least 75%, more preferably 90%. Very suitably natural gas or associated gas is used. Suitably, any sulphur in the feedstock is removed.

The partial oxidation of the methane comprising feedstock can take place according to various established processes. These processes include the Shell Gasification Process. A comprehensive survey of this process can be found in the Oil and Gas Journal, Sep. 6, 1971, pp 86-90. The partial oxidation in the sense of the present invention is a process wherein the syngas as obtained in the partial oxidation is not subsequently contacted with a reforming catalyst. In the partial oxidation process the methane comprising feedstock is converted into syngas having a temperature of between 1100 and 1500° C. This stream is then reduced in temperature in for example a boiler. The pressure at which the syngas product is obtained in the partial oxidation may be between 3 and 10 MPa and suitably between 5 and 7 MPa. The pressure is suitably at the same level as the operating pressure of the syngas conversion reactor such to avoid expansion or recompression between the various process steps. However recompression may be required if a good match between the operating pressure levels cannot be achieved. Preferably no steam is added to the partial oxidation process.

The partial oxidation process is performed such to achieve an almost 100% conversion of methane by combustion using a slight excess of oxygen. A slight excess is relative to the stoichiometric amount of oxygen required to perform a partial oxidation of the methane comprising feed. This excess of oxygen results in a syngas product having a hydrogen/carbon monoxide [$H_2/CO$] molar ratio below the molar feed ratio of the reactor, and especially in the range of 1.6-1.9 and having an inerts level of between 3 and 8 mol %.

The oxygen used in the partial oxidation process and in the ATR unit preferably has a purity of above 90 vol. % and more preferably above 99 vol. % to reduce the inerts level even further. Such pure oxygen is preferably obtained in a cryogenic air separation process or by so-called ion transport membrane processes.

The second process is a heat exchange reforming (HER) process, which prepares a syngas having a hydrogen/carbon monoxide [$H_2/CO$] molar ratio above the molar feed ratio of the syngas conversion reactor(s). Suitably the syngas as prepared in this second process has a $H_2/CO$ molar ratio in the range of 1.9 to 2.2 and an inerts level between 13 and 17 mol %.

The heat exchange reforming process comprises a heat exchange reformer unit (HER) and an auto-thermal reformer (ATR) unit. In one embodiment according to the invention part of the methane comprising feedstock and steam is fed to the HER unit and a second part is fed to the ATR unit. The effluent of the ATR unit, optionally in admixture with the effluent of the HER unit, is used to provide the necessary heat in the HER unit by means of indirect heat exchange. The parallel configured HER process may be performed as described in for example EP-A-1106570.

In another preferred embodiment of the invention the methane comprising feedstock and steam is for its majority or even more preferred, exclusively, fed to the HER unit. The effluent of the HER unit is used as feed in the ATR unit. The effluent of the ATR unit, in this configuration, is used to provide the necessary heat in the HER unit by means of indirect heat exchange. This so-called series process configuration is advantageous because a significant proportion of unconverted methane as is present in the effluent of the HER unit may then be converted in the ATR unit to carbon monoxide and hydrogen. The series configured HER process may be performed as described in for example U.S. Pat. No. 6,525, 104.

The HER unit is preferably a tube and shell reactor wherein a steam reforming reaction takes place in the tubes in the presence of a steam reforming catalyst at low steam:carbon ratio and wherein the required heat of the endothermic reaction is provided by passing the effluent of the ATR unit to the shell side of the reactor. The catalyst and process conditions as applied in the steam reformer reactor tubes may be those known by the skilled person in the field of steam reforming. Suitable catalysts comprise nickel optionally applied on a carrier, fro example alumina. The space velocity of the gaseous feed is preferably from 700 to 1000 liter (S.T.P.)/liter catalyst/hour, wherein S.T.P. means Standard Temperature of 15° C. and pressure of 1 atm abs. The steam to carbon (as hydrocarbon and CO) molar ratio is preferably from 0 up to 2.5 and more preferably below 1 and most preferably from 0.5 up to 0.9.

The steam reforming catalyst is normally in the form of shaped units, e.g. cylinders, rings, saddles, and cylinders having a plurality of through holes, and are typically formed from a refractory support material e.g. alumina, calcium aluminate cement, magnesia or zirconia impregnated with a suitable catalytically active metal such as nickel. At low steam to carbon process ratios at east a portion of the catalyst preferably includes a precious metal such as ruthenium.

The product gas as it leaves the tubes of the HER unit preferably has a temperature of from 650 up to 900° C. and a $H_2/CO$ molar ratio of from 4 up to 6. The operating pressure at the tube side is preferably between 2 and 5 MPa. The ATR unit is typically operated at a slightly lower pressure to avoid recompression of the syngas from the HER unit before feeding to the ATR unit. This means that in the HER unit the pressure at the shell side will suitably be the in this range as well. The ATR unit may be the well-known auto-thermal reformer units as commercially used.

The syngas as prepared in the HER process is combined with the syngas as prepared in the POX process to obtain the mixture of two different syngas streams. In a preferred embodiment of the present invention the syngas as prepared in the HER process is compressed from a pressure of below 4 MPa to the pressure of the syngas as prepared in the POX process pressure to obtain a mixture of the two different syngas streams having a pressure of between 5 and 10 MPa and wherein said mixture is used without any further compression as the syngas entry stream system into the syngas conversion reactor.

Preferably part or all of the residual tail gas of the syngas conversion reactor is fed to the ATR unit. This is advantageous for achieving the desired $H_2/CO$ molar ratio. Preferably part of the $CO_2$ in the residual tail gas is removed before feeding this tail gas to the ATR unit. The $CO_2$ removal is performed to arrive at the desired $H_2/CO$ ratio in the syngas. This separation may suitably be performed by means of membrane separation or by known solvent extraction process.

The Fischer-Tropsch (FT) process may be operated in a single pass mode ("once through") or in a recycle mode.

Preferably the molar feed ratio is preferably in the range 1.6-2.0, preferably from 1.7 to and including 1.9. Preferably the $H_2/CO$ molar ratio of the gas as it leaves a conversion reactor is in the range 0.1-0.9, preferably about 0.3-0.9.

The present invention could involve a multi-stage conversion process, which may involve, two, three, or more conversion stages, generally two.

Preferably, the CO conversion level during each stage of a multi-stage conversion process is in the range 70-95%, and more preferably about 80-95%. Using a two stage process, a 80% CO conversion level at each stage provides an overall approximate 96% CO conversion level.

In the present invention, the process may be carried out in one or more parallel syngas conversion reactors.

Fischer-Tropsch catalysts for use in the fixed bed catalyst beds of the syngas conversion reactor are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof and even more preferably titania.

References to the Periodic Table herein refer to the previous IUPAC version of the Periodic Table of Elements such as that described in the 68th Edition of the Handbook of Chemistry and Physics (CPC Press).

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalyst suitably has an average diameter of 0.5-15 mm. One form of catalyst is as an extrudate. Such extrudates suitably have a length of 2-10 mm, and a cross section suitably of 1-6 $mm^2$, especially 2-3 $mm^2$.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) atomic ratio is advantageously at least 12:1.

The Fischer-Tropsch synthesis is preferably carried out at a temperature in the range from 125° C. to 350° C., more preferably 175° C. to 275° C., most preferably 200° C. to 260° C. The pressure preferably ranges from 5 to 150 bar abs., more preferably from 5 to 80 bar abs.

The gaseous hourly space velocity may vary within wide ranges and is typically in the range from 500 to 10,000 Nl/l/h, preferably in the range from 1000 to 4,000 Nl/l/h.

It will be understood that the skilled person is capable to select the most appropriate conditions for a specific reactor configuration and reaction regime.

The present invention also provides a hydrocarbon product or products whenever formed by a process as herein described, including any products made by hydrocoversion of the hyrocarbon product, such as especially kerosene, gas oil and/or base oil. In particular, the present invention provides products generally formed by the Fischer-Tropsch process.

Products of the Fischer-Tropsch synthesis may range from methane to heavy paraffinic waxes. Preferably, the production of methane is minimised and a substantial portion of the hydrocarbons produced have a carbon chain of at least 5 carbon atoms. Preferably, the amount of C5+ hydrocarbons is at least 60% by weight of the total product, more preferably, at least 70% by weight, even more preferably, at least 80% by weight, most preferably, at least 85% by weight.

EXAMPLE ACCORDING THIS INVENTION

The following example has been modelled using PRO/II software as obtained from Invensys Process Systems, Plano, Houston (USA).

50% of the syngas entry stream system into the syngas conversion reactor is generated in a POX process and 50% in a HER process which is operating in a series flow configuration. Both POX and HER process are fed by the same natural gas feedstock. In addition a proportion of the residual tail gas from the syngas conversion reactor is fed to the ATR unit of the HER process such that the final feed to said ATR unit comprised of 34.5 vol. % $CH_4$, 11.9 vol. % $H_2O$, 6.1 vol. % $CO_2$, 10.8 vol. % CO and 29 vol. % $H_2$. The steam to carbon molar ratio of the natural gas feed to the tubes of the HER unit is 0.8.

The syngas compositions are combined and used as feed in a Fischer-Tropsch synthesis step as performed in a tubular reactor and in the presence of a cobalt-based catalyst. The conversion of syngas into compounds having 5 and more carbon atoms was 79%. From the residual tail gas some of the carbon dioxide is removed before using this gas as feed to the ATR unit.

The inerts level ($CO_2$, $N_2$, $CH_4$, Ar) of the mixture of the two different syngas streams is 8.9 mol %. The $H_2$/CO molar ratio (molar feed ratio) is 1.9.

Comparative Example A

The above example was repeated in an optimized Fischer-Tropsch process wherein the syngas entry stream system into the syngas conversion reactor is only prepared in a POX unit. The syngas entry stream had the following properties: a $H_2$/CO molar ratio of 1.8 and an inerts level of 4 mol %. The oxygen consumption as compared to the above example was 4% larger. The $CO_2$ emmissions of this optimized process was 54% larger than in the example according this invention.

Comparative Example B

The above example was repeated in an optimized Fischer-Tropsch process wherein the syngas entry stream system into the syngas conversion reactor is only prepared in a HER process. The syngas entry stream had the following properties: a $H_2$/CO molar ratio of 2.0 and an inerts level of 14.7 mol %. The oxygen consumption as compared to the above example was 19% lower. The $CO_2$ emmissions of this optimized process 5% lower than in the example according this invention.

The above examples show that a combined process provides a syngas having a low inerts level in combination with a lower $CO_2$ emmissions as would be expected when one would consider combining a HER and a POX process.

What is claimed is:

1. A process for the production of hydrocarbon products from a methane comprising feedstock comprising the steps of:
    preparing a feed syngas comprising hydrogen and carbon monoxide having a hydrogen/carbon monoxide molar feed ratio in a syngas manufacturing process and
    using the feed syngas in a Fischer-Tropsch process using one or more fixed bed catalyst beds as present in one or more syngas conversion reactors thereby obtaining a hydrocarbon product and a residual tail gas,
    wherein the manufacturing process comprises two parallel operated syngas manufacturing processes starting from the same gaseous methane comprising feedstock,
    wherein one syngas manufacturing process is a partial oxidation (POX) process which prepares a syngas having a hydrogen/carbon monoxide [$H_2$/CO] molar ratio below the molar feed ratio and
    wherein the second syngas manufacturing process is a heat exchange reforming (HER) process which prepares a syngas having a hydrogen/carbon monoxide [$H_2$/CO] molar ratio above the molar feed ratio, wherein the HER process comprises both an auto-thermal reformer and a heat exchange steam reformer.

2. A process according to claim 1, wherein the heat exchange reforming (HER) process comprises a heat exchange steam reformer unit (HER) and an auto-thermal reformer (ATR) unit and wherein part of the methane comprising feedstock is fed to the heat exchange steam reformer unit and a second part is fed to the ATR unit and wherein the effluent of the ATR unit is used to provide the necessary heat in the heat exchange steam reformer unit by means of indirect heat exchange.

3. A process according to claim 1, wherein the heat exchange reforming (HER) process comprises a heat exchange steam reformer unit and an auto-thermal reformer (ATR) unit and wherein the methane comprising feedstock is for its majority fed to the heat exchange steam reformer unit and wherein the effluent of the heat exchange steam reformer unit is used as feed in the ATR unit and wherein effluent of the ATR unit is used to provide the necessary heat in the heat exchange steam reformer unit by means of indirect heat exchange.

4. A process according to claim 2, wherein part or all of the residual tail gas is fed to the ATR unit.

5. A process according to claim 1, wherein the syngas as prepared in the HER process is compressed from a pressure of below 4 MPa to the pressure of the syngas as prepared in the POX process pressure to obtain a mixture of the two different syngas streams having a pressure of between 5 and 10 MPa and wherein said mixture is used without any further compression as the syngas entry stream system into the syngas conversion reactor.

6. A process according to claim 1, wherein the partial oxidation process is performed such to achieve an almost 100% conversion of methane by combustion using a slight excess of oxygen resulting in a syngas product having a hydrogen/carbon monoxide [$H_2/CO$] ratio in the range of 1.6-1.9 and having an inerts levels of between 3 and 8 mol %.

7. A process according to claim 1, wherein the heat exchange reforming process prepares a syngas having a hydrogen/carbon monoxide [$H_2/CO$] molar ratio in the range of 1.9 to 2.2 and an inerts level between 13 and 17 mol %.

8. A process according to claim 1, wherein in the POX process the methane comprising feedstock is partially combusted with oxygen having a purity of above 99 vol. %.

9. A process according to claim 2, wherein in the ATR unit the methane comprising feedstock or the effluent of the heat exchange steam reformer unit reacts with oxygen having a purity of above 99 vol. %.

10. Process according to claim 1, wherein the molar feed ratio is from 1.6 to 2.0.

* * * * *